United States Patent Office 2,778,838
Patented Jan. 22, 1957

2,778,838

DERIVATIVES OF DIHYDROSANTONIN AND A PROCESS FOR THEIR PREPARATION

Yasuo Abe, Osaka, Tadatsugu Harukawa, Kyoto, Hisashi Ishikawa, Kobe, Takuichi Miki, Hyogo, Masao Sumi, Osaka, and Tadashi Toga, Hyogo, Japan, assignors to Takeda Pharmaceutical Industries, Ltd., Higashi-ku, Osaka, Japan No Drawing. Application September 22, 1954, Serial No. 457,792

Claims priority, application Japan October 2, 1953

5 Claims. (Cl. 260—343.3)

This invention relates to derivatives of dihydrosantonin and a process for preparing them.

The inventors of the present application accomplished this invention by discovering that oxidation of (2-acyloxy-1,10-dimethyl - 3,4,5,6,7,10 - hexahydro-7-naphthyl)-malonic acid or its derivatives gives the lactone of (2-keto-8-trans-hydroxy - 1,10 - dimethyl - 2,3,4,5,6,7,8,10 - octahydro-7-naphthyl)-malonic acid or its derivatives, that is, derivatives of dihydrosantonin.

The detailed explanation of this invention is described hereunder.

According to the present invention the aforesaid derivatives of dihydrosantonin are prepared by the oxidation of (2-acyloxy-1,10-dimethyl-3,4,5,6,7,10-hexahydro-7-naphthyl)-malonic acid or its derivatives representable by the general formula

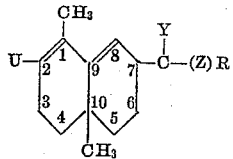

wherein U is acyloxy, R is hydrogen or methyl, Y is carboxyl, ester, amide or nitrile, and Z is carboxyl, ester, amide, nitrile or acyl. According to the present invention the starting materials may be optically active or not. These starting materials and the preparation thereof are known in the art; see e. g. Proceedings of the Japan Academy, vol. 30, page 119 (March 8, 1954); Chem. and Ind., March 13, 1954, pp. 311–312; and Japanese Patent No. 209,710, published August 21, 1954.

The reaction of this invention is effected with an appropriate oxidizing agent. As the oxidizing agent are suitable hydrogen peroxide and organic peracids such as performic acid, peracetic acid, perphthalic acid, perbenzoic acid, etc.

The object of this invention is also attained by subjecting the materials to oxidation with the peracid produced in the medium during the reaction. For example, the materials are oxidized with the peracid produced in the medium from an organic acid, its anhydride or their mixture and hydrogen peroxide, and this method is advisable for industrial purposes.

Catalyser may be used in this reaction. Ferrous sulfate as the Fenton's reagent, for instance, is often employed.

The reaction of this invention is conducted in a solvent, such as organic carboxylic acid, alcohol, acetone, dioxane, etc. or their mixture, and generally at room temperature. The reaction is carried out favorably at room temperature, but, if necessary, it may be effected at lower temperature or at comparatively higher temperatures such as 90° C., and in the latter case the reaction time is cut down.

Judging from the mechanism of the reaction the final products seem to be produced through intermediates which are thought to be 8,9- or 2,8-oxides of the materials. The intermediates, which in some cases can be separated from the reaction mixtures, are converted into the final products by controlled hydrolysis.

To isolate the final products the reaction mixtures are extracted with a suitable solvent, such as ether, ethyl acetate, acetone, benzene, chloroform, etc. and the extracts are evaporated to leave crystalline products, which are purified by recrystallization or chromatography.

According to the present invention the products representable by the following general formula wherein Z is an atomic group other than carboxyl can be converted by hydrolysis with alkali into the compounds representable by the general formula wherein Z is carboxyl, if necessary.

The final products of this invention are represented by the general formula

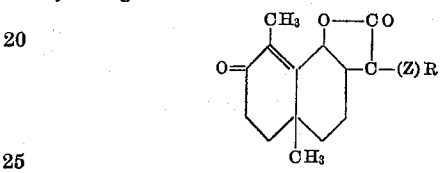

wherein R and Z have the same significances as mentioned above, and the lactone ring is trans-fused.

The final products of this invention are generally insoluble in water, but soluble in organic solvents, such as methanol, ethanol, ether, esters, benzene, chloroform and acetone, and have each an absorption maximum at 240–246 m$\mu$ (log $\epsilon$=above 4.0).

The final products of this invention are important intermediates for the synthesis of santonin. For example, when the final products are halogenated or acyloxylated at their $C_3$ and the halogen or acyloxy group is split off together with the hydrogen at $C_4$, or oxidized with selenium dioxide, santonin or its derivatives are produced.

The reaction of this invention proceeds according to the following scheme:

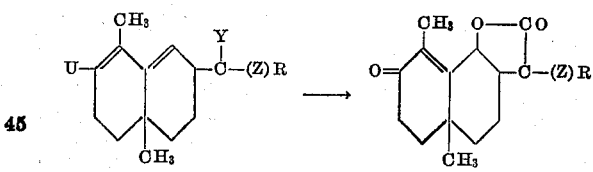

Example 1

To a solution of 10 g. of dimethyl (2-acetoxy-1,10-dimethyl-3,4,5,6,7,10-hexahydro - 7 - naphthyl)-methylmalonate in 50 cc. of glacial acetic acid is added 4.0 cc. of 30% hydrogen peroxide, and the mixture is allowed to stand at 30° C. over-night. The reaction mixture is concentrated in vacuo to two thirds of its original volume, diluted with some water and extracted with ether. The ethereal solution is washed successively with water, 10% sodium bicarbonate solution and water, and evaporated to leave 3.4 g. of a yellow oil. The oil is dissolved in 100 cc. of dioxane, and the solution is shaken with 30 cc. of 10% sulfuric acid at room temperature for 4 minutes, followed by rapid neutralization with sodium bicarbonate and extraction with ether. The ethereal solution is washed with water, dried and evaporated to leave 3.0 g. of a slightly yellow oil. Chromatography of the oil using alumina as adsorbent gives 1.5 g. of the lactone of methyl hydrogen (2-keto-8-trans-hydroxy-1,10-dimethyl-2,3,4,5,6,7,8,10-octahydro - 7 - naphthyl)-methylmalonate which crystallizes from methanol as rectangular plates melting at 136° C.

Example 2

To a solution of 10 g. of diethyl (2-acetoxy-1,10-dimethyl-3,4,5,6,7,10-hexahydro - 7 - naphthyl)-methylmalonate in 100 cc. of formic acid is added 3.15 cc. of 30% hydrogen peroxide, and the mixture is allowed to stand at 20° C. for 3 hours. The reaction mixture is extracted with ether, and the ethereal solution is washed with water, dried and evaporated to leave a crystalline product. When washed with petroleum ether the product gives 3.7 g. of the lactone of ethyl hydrogen (2-keto-8-trans-hydroxy - 1,10 - dimethyl - 2,3,4,5,6,7,8,10 - octahydro-7-naphthyl)-methylmalonate which crystallizes from methanol as colorless rhombic plates melting at 124° C. Chromatography of the mother liquor gives an isomer at C11 of the above compound which crystallizes from methanol as colourless rectangular plates melting at 132° C.

*Example 3*

To a solution of 10 g. of diethyl (2-acetoxy-1,10-dimethyl-3,4,5,6,7,10-hexahydro-7-naphthyl)-malonate in 100 cc. of formic acid is added 3.2 g. of 34% hydrogen peroxide at 20–22° C., and the mixture is left standing at the same temperature for 4.5 hours. The reaction mixture is treated as in Example 2 to give the lactone of ethyl hydrogen (2-keto-8-trans-hydroxy-1,10-dimethyl-2,3,4,5,6,7,8,10-octahydro-7-naphthyl)-malonate. When recrystallized from dilute methanol two isomers were obtained, one of which crystallizes as rhombic plates melting at 142° C., and the other containing water of crystallization melts at 86° C.

*Example 4*

To a solution of 3 g. of ethyl hydrogen (2-acetoxy-1,10-dimethyl - 3,4,5,6,7,10 - hexahydro - 7 - naphthyl)-methylmalonate in 30 cc. of formic acid is added 0.9 cc. of 34% hydrogen peroxide, and the mixture is left standing at room temperature for 2 hours. The reaction mixture is treated as in Example 2 to give 1.5 g. of the crude lactone of ethyl hydrogen (2-keto-8-trans-hydroxy-1,10-dimethyl - 2,3,4,5,6,7,8,10 - octahydro - 7 - naphthyl)-methylmalonate. When hydrolyzed with 10% potassium hydroxide solution at room temperature the product gives (2-keto-8-trans-hydroxy - 1,10 - dimethyl-2,3,4,5,6,7,8,10-octahydro-7-naphthyl)-methylmalonic acid melting at 215° C. with decomposition.

*Example 5*

To a solution of 10 g. of diethyl (2-acetoxy-1,10-dimethyl-3,4,5,6,7,10-hexahydro - 7 - naphthyl)-methylmalonate in 50 cc. of methanol are added 5.6 cc. of 34% hydrogen peroxide and 0.5 g. of ferrous sulfate, and the mixture is allowed to stand at room temperature for 4 days. The methanol is distilled from the reaction mixture, the residue is taken up in ether, and the ethereal solution, after being washed with sodium bicarbonate solution and water and dried, is evaporated to give 0.2 g. of the lactone of ethyl hydrogen (2-keto-8-trans-hydroxy-1,10-dimethyl - 2,3,4,5,6,7,8,10 - octahydro - 7 - naphthyl)-methylmalonate melting at 124° C.

*Example 6*

A solution of 10 g. of diethyl (2-acetoxy-1,10-dimethyl-3,4,5,6,7,10-hexahydro-7-naphthyl)-methylmalonate in 50 cc. of propionic acid is heated in boiling water, and 4 cc. of 34% hydrogen peroxide is added at one portion to the hot solution. The mixture is stirred at the same temperature for 4 hours and then treated as in Example 2 to give 2.8 g. of the lactone of ethyl hydrogen (2-keto-8-trans-hydroxy - 1,10 - dimethyl - 2,3,4,5,6,7,8,10 - octahydro-7-naphthyl)-methylmalonate melting at 124° C.

*Example 7*

A solution of 10 g. of diethyl (2-acetoxy-1,10-dimethyl-3,4,5,6,7,10-hexahydro-7-naphthyl)-methylmalonate in 50 cc. of n-butyric acid is heated in boiling water, and 10 cc. of 34% hydrogen peroxide is added to the hot solution with stirring. The stirring is continued at the same temperature for 40 minutes, and the reaction mixture is treated as in Example 2 to give 2.5 g. of the lactone of ethyl hydrogen (2-keto-8-trans-hydroxy-1,10-dimethyl-2,3,4,5,6,7,8,10-octahydro - 7 - naphthyl)-methylmalonate melting at 124° C.

*Example 8*

A solution of 10 g. of diethyl (2-benzoxy-1,10-dimethyl-3,4,5,6,7,10-hexahydro-7-naphthyl)-methylmalonate in 60 cc. of acetic acid is heated at 60° C., and 4.4 cc. of 30% hydrogen peroxide is added to the hot solution. The temperature is gradually raised, and the mixture is gently boiled for 5 minutes and then treated as in Example 2. The product is recrystallized from alcohol to give 2 g. of the lactone of ethyl hydrogen (2-keto-8-trans-hydroxy - 1,10 - dimethyl - 2,3,4,5,6,7,8,10 - octahydro-7-naphthyl)-methylmalonate melting at 124° C.

*Example 9*

A solution of 10 g. of diethyl (2-benzoxy-1,10-dimethyl-3,4,5,6,7,10-hexahydro-7-naphthyl)-methylmalonate in a mixture of 45 cc. of acetic acid and 15 cc. of formic acid is heated at 60–65° C., and 4.4 cc. of 30% hydrogen peroxide is added to the hot solution. The mixture is kept at the same temperature for one hour, and after cooling the reaction mixture is treated as in Example 2 to give 2.3 g. of the lactone of ethyl hydrogen (2-keto-8-trans-hydroxy - 1,10 - dimethyl - 2,3,4,5,6,7,8,10 - octahydro-7-naphthyl)-methylmalonate melting at 124° C.

*Example 10*

A solution of 10 g. of diethyl (2-benzoxy-1,10-dimethyl-3,4,5,6,7,10-hexahydro-7-naphthyl)-methylmalonate in 50 cc. of acetic acid is heated at 70° C., and 2.2 cc. of 30% hydrogen peroxide is added to the hot solution, when the temperature rises to 80° C. The mixture is kept at 60–70° C. for 30 minutes and treated as in Example 2 to give 2.5 g. of the lactone of ethyl hydrogen (2-keto-8-trans-hydroxy-1,10-dimethyl - 2,3,4,5,6,7,8,10 - octahydro-7-naphthyl)-methylmalonate melting at 124° C.

What is claimed is:

1. A process for preparing a compound which corresponds to the general formula

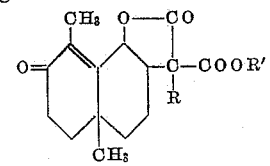

wherein R is a member selected from the group consisting of hydrogen and methyl, R' is a member selected from the group consisting of hydrogen and lower alkyl and the lactone ring is trans-fused, which comprises reacting the compound which corresponds to the general formula

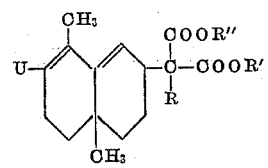

wherein R and R' have the afore-recited significances, U is a member selected from the group consisting of acetoxy and benzoxy, and R" is a member selected from the group consisting of hydrogen and lower alkyl, with an oxidizing reagent which is a member selected from the group consisting of hydrogen peroxide and organic peracid.

2. A compound which corresponds to the general formula

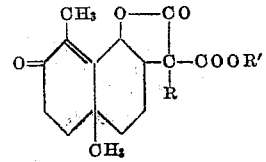

wherein R is a member selected from the group consisting of hydrogen and methyl, and R' is a member selected from the group consisting of hydrogen and lower alkyl, and the lactone ring is transfused.

3. A compound which corresponds to the formula

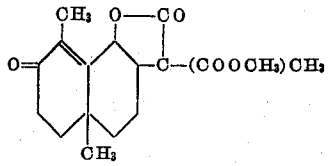

wherein the lactone ring is transfused.

4. A compound which corresponds to the formula

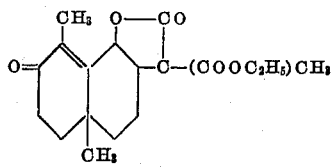

wherein the lactone ring is transfused.

5. A compound which corresponds to the formula

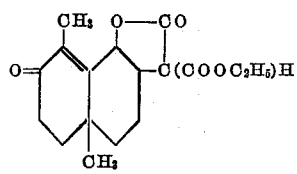

wherein the lactone ring is transfused.

References Cited in the file of this patent

FOREIGN PATENTS

| | | |
|---|---|---|
| 126,585 | Austria | Jan. 25, 1932 |
| 323,187 | Great Britain | Dec. 23, 1929 |
| 341,402 | Great Britain | Jan. 7, 1931 |

OTHER REFERENCES

Wedekind et al.: Berichte 64, pp. 1796–1807 (1931).
Gunstone et al.: J. Chem. Soc., 1952, 1354–1358.